No. 846,927. PATENTED MAR. 12, 1907.
O. LASCHE.
FLUID PRESSURE THRUST BEARING.
APPLICATION FILED JULY 24, 1905.
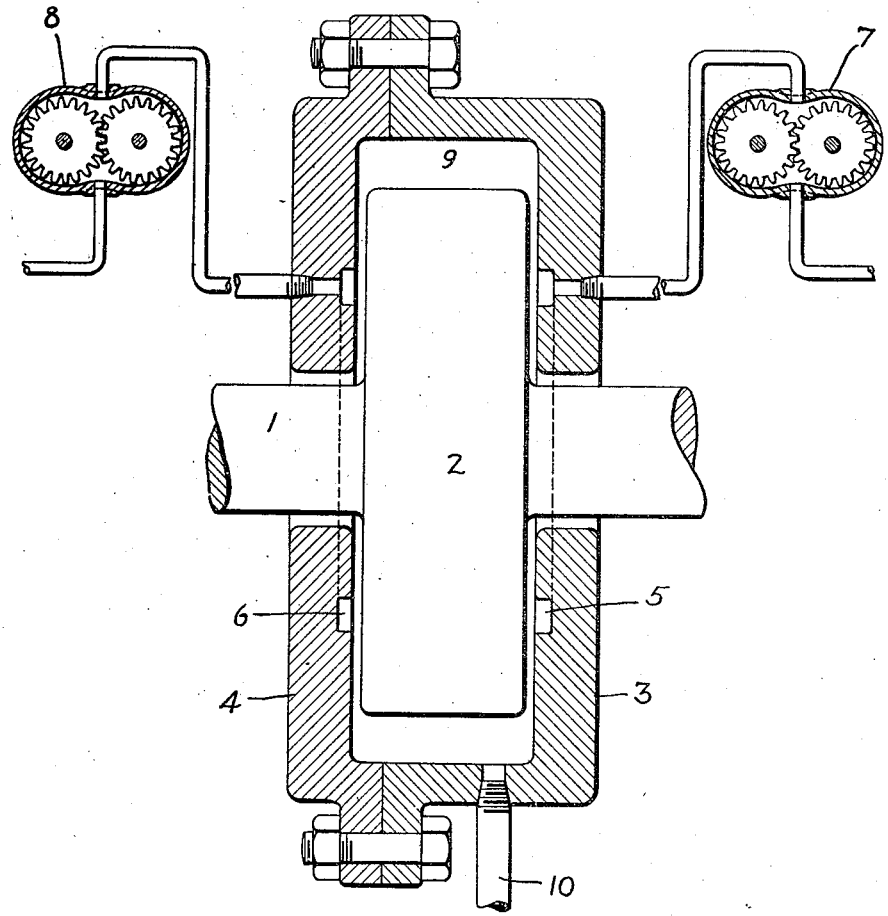
Witnesses
Benjamin B. Hull
Margaret E. Hooley
Inventor:
Oskar Lasche,
By Albert G. Davis
Atty.

UNITED STATES PATENT OFFICE.

OSKAR LASCHE, OF BERLIN, GERMANY, ASSIGNOR TO GENERAL ELECTRIC COMPANY, A CORPORATION OF NEW YORK.

FLUID-PRESSURE THRUST-BEARING.

No. 846,927.     Specification of Letters Patent.     Patented March 12, 1907.

Application filed July 24, 1905. Serial No. 270,972.

*To all whom it may concern:*

Be it known that I, OSKAR LASCHE, a subject of the Emperor of Germany, residing at Berlin, Germany, have invented certain new and useful Improvements in Fluid-Pressure Thrust-Bearings, of which the following is a specification.

Machines, and particularly those which are subjected to a heavy axial thrust first in one direction and then in the opposite, require that the thrust-bearing for the shaft shall be ready at any moment to take the thrust irrespective of its direction. If the bearing receives lubricant under pressure from a single pump, the supply must be reversed when the direction of thrust is reversed. This reversing of the supply of lubricant is usually too early or too late and requires either special attention on the part of an operator or an automatic reversing device, which, as is shown by experience, may refuse to act, owing to some difficulty, and in consequence the bearing is injured or ruined, as the case may be.

The object of the present invention is to provide a fluid-pressure thrust-bearing which is free from the objections above noted, is simple and rugged in construction, and reliable in operation.

In the accompanying drawing, which is illustrative of one embodiment of my invention, is shown a thrust-bearing with certain of the parts in section.

In carrying out the invention, the shaft is provided with one, two, or more collars, which may be separate and rigidly secured to the shaft or formed integral therewith. Surrounding the collar or collars is a casing, which presents smooth surfaces to the side walls of the collar or collars and is divided into parts—for example, into right and left hand members. In the inner face or walls of the casing and adjacent to the collar are one or more grooves or chambers surrounding the shaft, which communicate with separate sources of fluid under pressure. A pump can with advantage be connected to the left-hand groove or grooves and a separate pump connected to the right-hand groove or grooves. These pumps should be of such a character that they will deliver the necessary constant or approximately constant amount of fluid per unit of time, and this independent of the pressures created. The quantities of lubricant delivered by the pumps per units of time are generally equal if the axial thrusts in opposite directions are equal, but in case the thrusts are unequal the amounts delivered may be unequal. The pipes or conduits leading from the source of supply to the grooves or chambers in the fixed casing should be large enough in cross-section to reduce the resistance to flow to a minimum. The shaft which is subjected to axial thrust is arranged to have a slight axial movement within the casing or the casing may have a slight longitudinal movement with respect to the shaft. The main thing is to provide for a slight relative movement in a longitudinal direction between said parts. The collar, by its position in the casing, determines the pressures of the fluid supplies. When the collar is near one wall, the pressure of the supply on that side is greater than when it is more remote, because the cross-sectional area of the outlet is decreased. Under this condition, the pressure on the opposite side is low, because the area of the outlet is large.

Assuming that both pumps are delivering equal amounts of lubricant, which may be water, oil, or other non-compressible fluid, per given unit of time, the resistance to the flow of one pump will be greater in one case than in the other where the space between the collar and a side wall is less on one side than on the other. The fluid-discharge into the casing is collected at a suitable point or points and may be returned to the pumps, if desired.

When the collar is midway between the side walls of the casing and separated by relatively small spaces, the pumps will only have to overcome a relatively small resistance—for example, .8 of an atmosphere. On the other hand, if a thrust is exerted on the shaft from the left it will force the collar nearer to the right-hand wall of the casing than the left, and the pressure of the fluid delivered to the adjacent groove or chamber will be increased, for the volume remains constant, or substantially so. For example, a pressure of .3 of an atmosphere may exist in the left-hand groove and a pressure of ten atmospheres in the right-hand groove. This combination pressure-bearing will then work as a simple bearing, which has a fluid-pressure equal to the difference in pressures prevailing in the grooves—*i.e.*, ten atmospheres minus .3 of an atmosphere equals 9.7 atmospheres opposing the thrust. If the thrust is exerted on the shaft from the right, the reverse action will take place and the pressure in the left-hand groove or chamber will automatically increase, while that in the right decreases. From the foregoing it will be seen that the bearing is ready at any instant to take up the thrust of the shaft in either direction and in any amount from the minimum to the maximum, and this without the necessity of changing the lubricant-supply. The specific pressure of the lubricant can be regulated by the amount delivered by the pumps.

The invention can be applied equally well to an arrangement wherein a plurality of collars are provided in the same or different casings. The chambers or grooves may each be supplied with lubricant by a pump or a group of pumps, as desired.

In the drawing, 1 represents the shaft, which is subjected to thrust first in one direction and then in another, and mounted thereon or formed integral therewith is a collar 2 of suitable diameter. Surrounding the collar is a casing comprising right and left hand members 3 and 4. The parts of the casing are united by bolts or equivalent means. The inner walls of the casing and the opposing side walls of the collar are suitably finished. The casing and the collar have a limited amount of longitudinal movement with respect to each other. The clearance or space between the relatively moving parts is somewhat exaggerated in the drawing for the purpose of illustration. Formed in the walls of the casing are grooves or chambers 5 and 6. Lubricant under pressure is supplied to the groove 5 by the pump 7, which may be of the gear type. It should be capable of delivering a constant or substantially constant volume of fluid per unit of time irrespective of the pressure. To the groove 6 is connected the delivery-pipe of a pump 8 of similar character. Surrounding the collar and located between it and the inner cylindrical wall of the casing is a collection-chamber 9, that discharges through the conduit 10 to the suction side of the pumps or to other suitable exhaust. The shaft 1 may pass freely through the casing or suitable packings for the shaft may be provided. When these packings are omitted, a certain amount of fluid under pressure will escape around the shaft to the outside of the casing.

What I claim as new, and desire to secure by Letters Patent of the United States, is—

1. A thrust-bearing comprising a collar which is carried by a spindle and is subjected to thrust first in one direction and then in the other, a casing having walls located on opposite sides of the collar, and means for simultaneously and continuously supplying lubricant under such pressure to the spaces between the opposite sides of the collar and the walls of the casing as will keep the parts lubricated irrespective of the direction and amount of the thrust.

2. A thrust-bearing comprising a collar which is mounted on a spindle and is subjected to axial thrust first in one direction and then in the other, walls located on opposite sides of the collar, the collar and walls having slight longitudinal movement with respect to each other, and means which supply constant or substantially constant amounts of lubricant independent of the pressure to the spaces between the sides of the collar and the walls.

3. A thrust-bearing comprising a collar which is mounted on a spindle and is subjected to axial thrust first in one direction and then in the other, walls located on opposite sides of the collar, the collar and walls having slight longitudinal movement with respect to each other with chambers between the sides of the collar and the walls, and separate sources of supply which supply lubricant to the chambers at variable pressure and substantially constant volume.

4. A thrust-bearing comprising a collar which is mounted on a spindle and is subjected to axial thrust first in one direction and then in the other, walls located on opposites sides of the collar, the collar and walls having slight longitudinal movement with respect to each other with chambers surrounding the shaft and located between the sides of the collar and the walls, and separate pumps which continuously supply lubricant to said chambers.

5. A thrust-bearing comprising a collar which is mounted on a spindle and is subjected to an axial thrust first in one direction and then in the other, a casing surrounding the collar, the collar and casing being arranged to have slight independent longitudinal movement, and separate pumps which continuously supply lubricant to the spaces between the collar and casing, the pressures of the fluid delivered by the pumps being governed by the position of the collar with respect to the walls of the casing.

6. A thrust-bearing comprising a collar which is mounted on a spindle and is subjected to an axial thrust first in one direction and then in the other, a divided casing which surrounds the collar, the collar and casing being arranged to have slight independent longitudinal movement, separate pumps which continuously supply lubricant to the spaces between the collar and casing, the pressures of the fluid delivered by the pumps being governed by the position of the collar within the casing, there being a chamber located between the axle and the cylindrical walls of the casing for collecting the fluid from the pumps after it flows between the inner walls of the casing and the collar, and an outlet which is common to the pumps and collection-chamber.

In witness whereof I have hereunto set my hand this 29th day of June, 1905.

OSKAR LASCHE.

Witnesses:
 MAX HAMBURGER,
 PAUL WAGNER.